United States Patent [19]

Sziklas

[11] 4,170,405
[45] Oct. 9, 1979

[54] RESONATOR HAVING COUPLED CAVITIES WITH INTERCAVITY BEAM EXPANSION ELEMENTS

[75] Inventor: Edward A. Sziklas, N. Palm Beach, Fla.

[73] Assignee: United Technologies Corporation, Hartford, Conn.

[21] Appl. No.: 848,697

[22] Filed: Nov. 4, 1977

[51] Int. Cl.² .............................................. H01S 3/05
[52] U.S. Cl. ................................ 350/299; 331/94.5 C
[58] Field of Search ..................... 331/94.5 C; 350/299

[56] References Cited

U.S. PATENT DOCUMENTS

| 4,025,172 | 5/1977 | Freiberg | 331/94.5 C |
| 4,050,036 | 9/1977 | Chambers et al. | 331/94.5 C |

*Primary Examiner*—William L. Sikes
*Attorney, Agent, or Firm*—Lawrence A. Cavanaugh

[57] ABSTRACT

A resonator is disclosed having a mode control cavity and a power extraction cavity capable of being independently optimized to produce a laser beam having high power and good optical quality in the far field. The mode control cavity is a positive branch confocal unstable resonator having large geometric magnification and a low Fresnel number to provide mode discrimination against higher order radial and azimuthal modes such that the lowest loss mode, typically the lowest order fundamental mode is strongly favored. The power extraction cavity is adapted to accommodate a gain medium having a large volume. A first cone adapted to provide line of sight communication between the mode control cavity and the power extraction cavity optically couples the cavities and provides means for varying the diameter of radiation passing between the mode control cavity and the power extraction cavity.

15 Claims, 5 Drawing Figures

RESONATOR HAVING COUPLED CAVITIES WITH INTERCAVITY BEAM EXPANSION ELEMENTS

The invention herein described was made in the course of or under a contract or subcontract thereunder, with the Department of the Air Force.

BACKGROUND OF THE INVENTION

The present invention relates to radial flow lasers and more particularly to an optical resonator having coupled cavities adapted to accommodate a large volume gain medium and to provide a lowest loss mode to radiation circulating within the resonator.

Laser systems which provide an output beam at a very high power level such as those made possible with combustion driven chemical laser are subject to various restraints which limit the beam quality and output power from such a system. One of these limitations is due to a phenomenon which is commonly referred to as superfluorescence, a condition under which a gain medium having a population inversion produces spurious beams of laser radiation without an interaction with any of the optical components of the resonator. The spurious beams are undesirable because they deplete the population inversion which would otherwise be available for controlled simulated emission from the working medium.

One of the concepts advanced to increase the amount of working medium available without incurring superfluorescence effects is disclosed by Freiberg et al in the U.S. Pat. No. 3,969,687 entitled "Standing Wave Unstable Resonators for Radial Flow Lasers" filed on Apr. 14, 1975 and held with the present application by a common assignee. The unstable resonator is formed having a centerline axis with a gain region in the configuration of a thin wall cylinder disposed symmetrically about the centerline axis. A cylindrical gas source region is disposed adjacent to the interior of the gain region and symmetrically about the centerline axis. The system optics form an unstable resonator capable of providing an output beam having an annular cross-section. The resonator is a standing wave positive branch confocal device in which toroidal and annular mirrors are utilized.

The complex optical reflecting surfaces utilized with chemical lasers are extremely difficult and costly to manufacture, especially for high power applications for which water-cooling is required. A stable optical resonator employing simple optical reflecting surfaces and capable of being used in chemical lasers is disclosed by Sziklas in U.S. patent application Ser. No. 789,751 entitled "Stable Optical Resonator" filed on Apr. 21, 1977 and held with the present application by a common assignee. A stable resonator is provided which is disposed symmetrically about a centerline axis, having an optical cavity defined at one end by an unstable resonator and at the other end by a reflector. The unstable resonator comprises a convex mirror and a concave mirror. A flat reflector in optical communication with the unstable resonator is capable of retroreflecting the output of the unstable resonator back into the unstable resonator. When an active medium is disposed between the unstable resonator and the reflector, the resonator is capable of providing an output beam having high power and high optical quality. High optical quality of the beams results from the effective discrimination against high order transverse modes provided by the unstable resonator.

A resonator having coupled cavities is disclosed by Sziklas et al in application Ser. No. 848,792, now U.S. Pat. No. 4,164,366 entitled "Variable Output Coupled Resonator" filed on even date and held with the present application by a common assignee. The resonator described therein includes a mode control cavity, a power extraction cavity, a cone adapted to be linearly moved along a beam axis of the power extraction cavity in the resonator to out couple a laser beam and means for varying the cross-sectional area of a beam of radiation as the radiation passes between the cavities. The mode control cavity is off axis to the power extraction cavity.

Freiberg in U.S. Pat. No. 4,025,172 entitled "Compound Unstable Resonator" filed Oct. 9, 1975 and held with the present application by a common assignee discloses an unstable resonator having an annular end mirror, a circular end mirror and a conical folding mirror disposed symmetrically about a centerline axis through the resonator wherein the apex of the conical mirror and the center of the circular mirror have reflective surfaces modified to form an unstable resonator therebetween. The circular mirror disclosed therein has a compound radius of curvature which is difficult to fabricate.

Prior art resonators employ complex optical reflective surfaces which are difficult to manufacture or employ a single optical cavity in which the conditions for providing an output beam having both high power and good optical quality cannot be independently optimized. Also, prior art resonators adapted for accommodating gain medium having a large volume require mode control resonators having a large separation between the optical components defining the mode control resonator to provide an output beam having good optical quality.

SUMMARY OF THE INVENTION

A primary object of the present invention is to provide a laser beam having both high power and good optical quality.

According to the present invention a resonator having a centerline axis and formed with optically connected cavities comprises a mode control cavity defined at one end by a first mirror and at the other end by a second mirror, a power extraction cavity defined at one end by a first reflector and at the other end by a first conical mirror, means for optically coupling the mode control and power extraction cavities and means for out coupling a laser beam from the resonator. A feature of the present invention is the mode control cavity disposed symmetrically about the centerline axis wherein the first and second mirror cooperate to form an unstable resonator. Additionally, the power extraction cavity disposed symmetrically about the centerline axis is capable of accommodating a large volume annular gain medium. A first cone having an exterior reflective surface in line of sight communication with an interior reflective surface of the first conical mirror and with a concave reflective surface on the first mirror optically couples the mode control cavity with the power extraction cavity. Additionally, the first cone is disposed symmetrically about the centerline axis and has an apex axially positioned behind the second mirror. A stripper mirror positioned on and symmetrically about the centerline axis within the mode control cavity is adapted to out couple a portion of a circulating beam within the resonator to provide a laser beam having an annular cross-section. A feature of an embodiment of the present invention is a convex reflective surface on the apex of the first cone which cooperates with the first mirror to define the mode control cavity. A feature of a further embodiment of the present invention is the power extraction cavity symmetrically disposed about the mode control cavity. A variation of this embodiment includes a second conical mirror having an interior reflective surface defining one end of the power extraction region and the first conical mirror defining the other end and includes a second cone having an apex and an exterior reflective surface symmetrically disposed about the centerline axis substantially centered within the second conical mirror capable of out coupling a portion of a circulating beam of radiation within the resonator to provide a laser beam.

A primary advantage of the present invention is the ability to independently optimize the mode control cavity and the power extraction cavity. Additionally, a large volume of gain medium capable of producing high power can be accommodated in the power extraction cavity while maintaining a compact mode control cavity. The low Fresnel number of the mode control cavity results in good optical quality of the output beam. Also, the apex of the first cone is shielded from the high power of the radiation circulating within the resonator by the second mirror and is not subject to deterioration by the high power radiation. An advantage of an embodiment of the present invention is the compact size of the resonator. Additionally, coupling the radiation out of the resonator with a second cone produces an output beam capable of having a continuous cross-section.

The foregoing and other objects, features and advantages of the present invention will become more apparent in the light of the following detailed description of the preferred embodiments thereof as illustrated in the accompanying drawing.

DESCRIPTION OF THE PREFERRED EMBODIMENT

Figure 1:
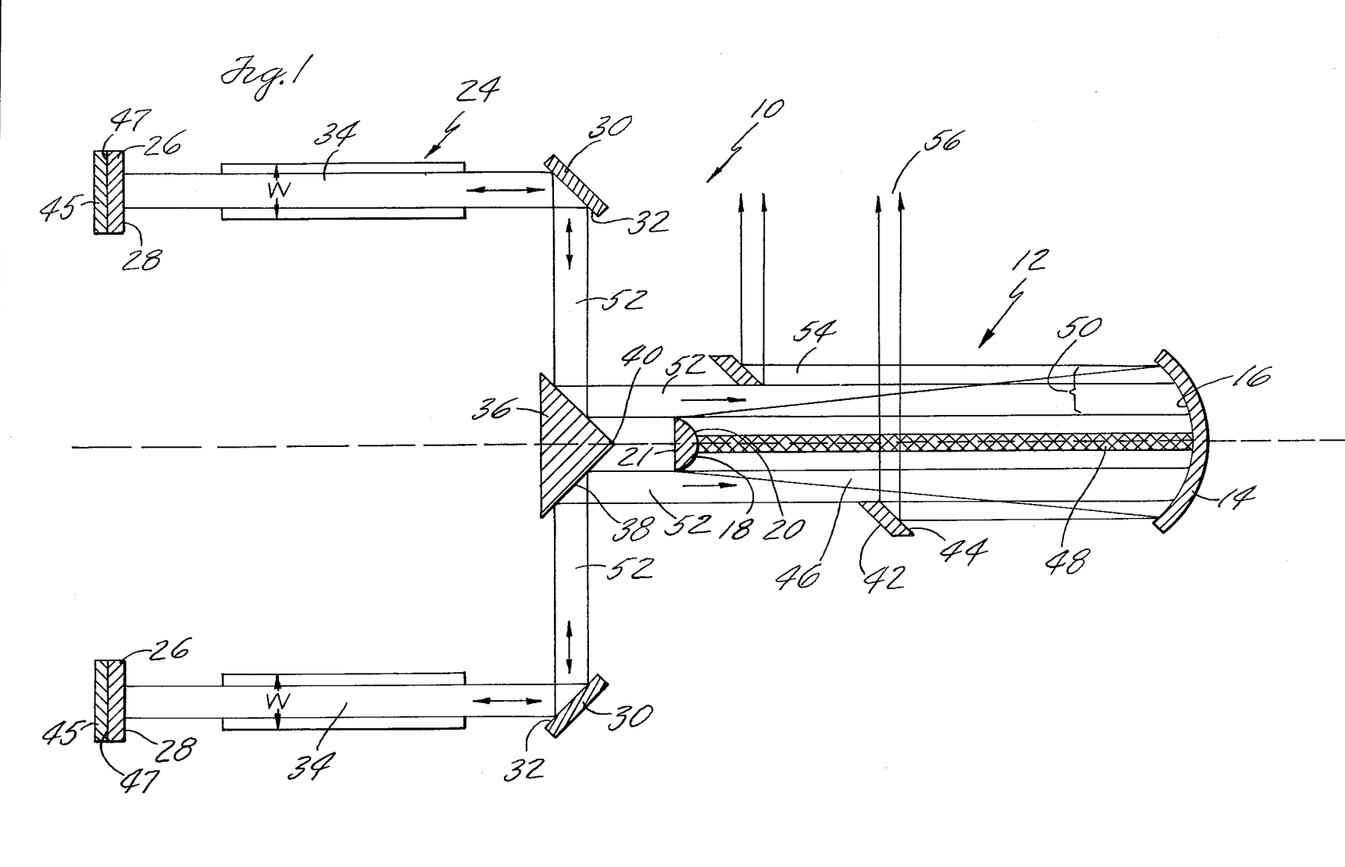
FIG. 1 is a simplified schematic of a cross-sectional view of the resonator showing the principle optical elements of the coupled cavities.
Figure 2:
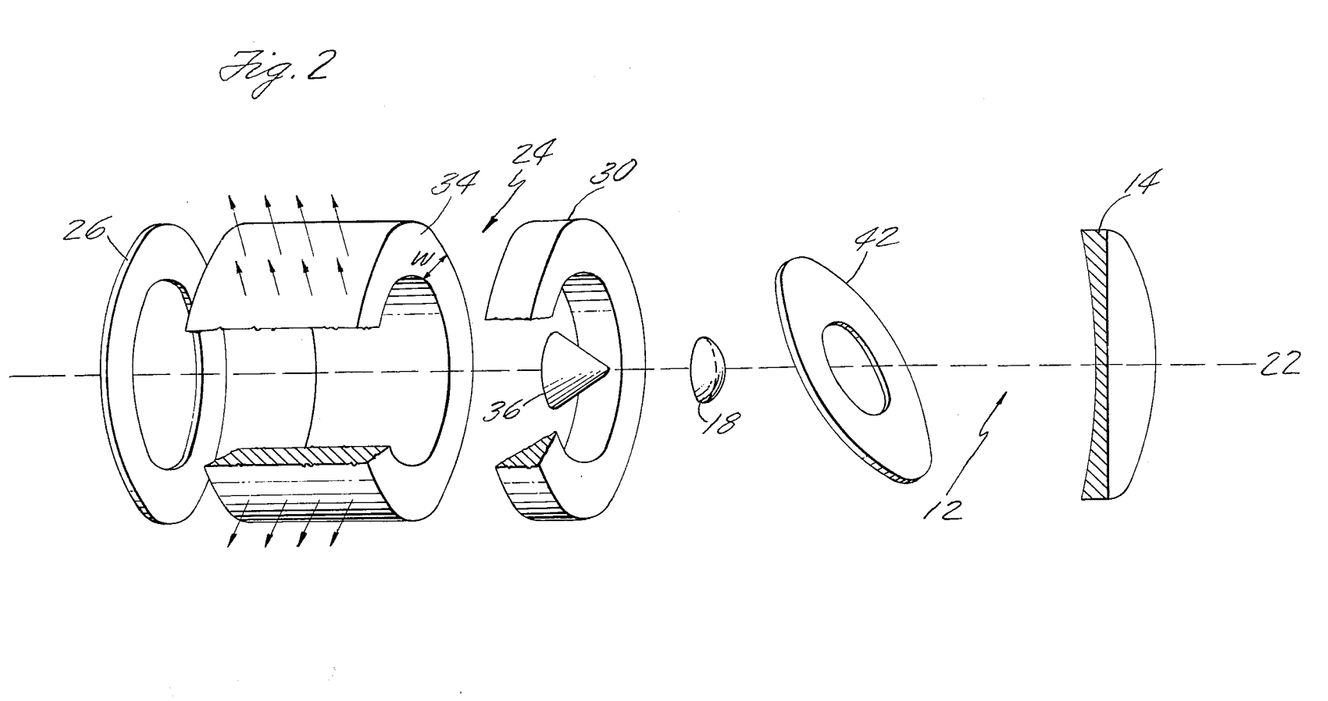
FIG. 2 is a perspective view of the resonator shown in FIG. 1.

The positional relationship of the elements of a resonator 10 having coupled cavities and capable of accommodating a gain medium having a large volume is shown in FIGS. 1 and 2. A mode control cavity 12 defined at one end by a first mirror 14 having a concave reflective surface 16 and at the other end by a second mirror 18 having a convex reflective surface 20 and a back surface 21 is shown positioned on and symmetrically about a centerline axis 22. A power extraction cavity 24 defined at one end by an annular reflector 26 having a flat reflective surface 28 and at the other end by a first conical mirror 30 having an interior reflective surface 32 and capable of accommodating an annular gain medium 34 having a large volume is shown positioned on and symmetrically about the centerline axis 22. A first cone 36 having an exterior reflective surface 38 and an apex 40 is disposed on and symmetrically about the centerline axis 22 and is substantially centered within the first conical mirror 30. A stripper mirror 42 having a reflective surface 44 and an aperture 46 is positioned on and concentrically about the centerline axis within the mode control cavity 12. A piezoelectric activator 45 is attached to the back surface 47 of the annular reflector 26.

The mode control cavity 12 is a positive branch confocal unstable resonator having large geometric magnification and a low Fresnel number to provide mode discrimination against high order radial and azimuthal modes such that the lowest loss mode, typically the lowest order fundamental mode, is strongly favored. The mode control cavity is a converging-diverging optical system capable of expanding and compressing electromagnetic radiation circulating therein by repeated reflections between the first and second mirrors 16 and 18. In operation the radiation within the mode control cavity is compressed toward the centerline axis 22 by multiple reflections between the concave and convex surfaces of the first and second mirrors into a diffraction dominated portion 48 of the mode control cavity. Eventually, diffractive spreading causes the compressed inwardly propagating radiation to expand which transforms the compressed radiation into outwardly propagating radiation having a lowest loss mode which fills the entire surface area of the reflective surface 20 of the second mirror 18. The radiation further expands to the first mirror 14 where it is reflected by the reflective surface 16 toward the power extraction cavity 24 as a collimated beam of radiation 50. The inner diameter portion 52 of the collimated beam 50 passes through the aperture 46 in the stripper mirror 42 and is incident onto the exterior reflecting surface 38 of the first cone 36 which expands the beam of radiation to a large diameter annular beam and directs the radiation to the power extraction cavity 24. The interior reflective surface 32 of the first conical mirror 30 which defines one end of the power extraction cavity directs the radiation through the annular gain medium 34. The radiation efficiently extracts energy from the gain medium as it passes therethrough and is reflected by the flat reflective surface 28 of the annular reflector 26 back through the annular gain medium where additional power is extracted. The radiation is then compressed by the reflective surfaces of the first conical mirror and the first cone to a small diameter annular beam and passed into the mode control cavity 12 where the process is repeated. The outer diameter portion 54 of the circulating beam of radiation 50 within the mode control cavity 12 is incident onto the stripper mirror 42 and reflected by the reflected surface 44 to form an output beam 56 having an annular cross-section.

The operation of many high power lasers require that the optical flux in the gain medium of the resonator be as high as possible to efficiently saturate the gain of the working medium and to effectively extract the available power from the resonator. This is particularly important for regions exhibiting the highest small signal gain such as those near the inside surface of a cylindrical sheath of gain medium. An inability to saturate the extraction process limits the power output of such a resonator to something less than what is otherwise available. The collimated annular beam of radiation 52 of the present invention is particularly suited for power extraction from the annular gain configuration of chemical lasers having dimensions consistent with the requirements of superfluorescence.

The output beam 56 has good optical quality resulting from the proper transformation of the beam within the mode control cavity to produce effective diffractive cross-coupling of the phase fronts from various portions of the annular beam throughout the gain medium. This cross-coupling transforms the annular portions of the collimated beam of radiation 52 passing through the gain medium into the laser beam 56 all portions of which are in phase coherent with one another. The actual diffractive cross-coupling occurs in the immediate vicinity of the centerline axis 22 which is the diffractive dominated portion 48 of the mode control cavity.

Merely combining mirrors having convex and concave reflective surfaces to form an unstable resonator has been done previously. However, in the resonator configuration shown in FIG. 1, the mode control cavity which is an unstable resonator is independent of the power extraction cavity in that the mode control cavity and the power extraction cavities can be independently optimized to produce an output beam having good optical quality and high power. The good optical quality results from the proper transformation of the wavefronts in the diffraction dominated portion of the mode control cavity while the high power results from the ability of the power extraction cavity to accommodate gain media having large volumes.

Good optical quality of the laser beam requires a low Fresnel number for the resonator. The Fresnel number $N_f$ for the resonator is defined as $N_f = d^2/\lambda L$ where d is the diameter of the beam within the resonator, $\lambda$ is the wavelength of the radiation and L is a separation distance between the optical components defining the resonator. As the diameter of a gain medium is increased, the diameter of the radiation within the resonator also typically increases resulting in the requirement for an increased separation between the optical components defining the resonator to maintain a low value of $N_f$. Varying the diameter of the radiation circulating within the resonator provides the capability of having radiation with a large diameter extracting high power from a gain medium having a large volume while providing radiation having a small diameter to the mode control cavity. The optical quality of the output beam will be dependent upon the Fresnel number of the mode control cavity. The small diameter beam within the mode control cavity requires a small distance separating the first and second mirrors to produce a low Fresnel number which results in high optical quality of the output beam.

As shown in FIG. 2, the annular gain medium 34 is in the configuration of a thin cylindrical sheath having an interior diameter $d_1$ and an exterior diameter $d_2$. The volume of the gain medium can be increased by increasing $d_1$ and $d_2$ such that the width w of the sheath remains constant and the problems of superfluorescence can be avoided. The gain medium flows radially away from the centerline axis 22.

The cross-sectional dimensions of the output beam 56 is independent of the width w of the gain medium 34 within the power extraction cavity. The cross-sectional dimensions of the output beam are controlled by the cross-sectional area of the stripper mirror and the magnification of the mode control cavity. The magnification of the mode control cavity is dependent upon the length of the mode control and the radius of curvature of the mirrors defining the cavity as disclosed in U.S. Pat. No. 3,969,685 which is incorporated herein by reference.

The apex 40 of the first cone 36 is positioned proximate to the back surface 21 of the second mirror 18 defining one end of the mode control cavity such that the apex is not exposed to the radiation circulating within the resonator. The relative position of the apex of the first cone and the second mirror enables the resonator to support a circulating beam of radiation having high power without deteriorating the apex of the first cone. In addition, eliminating the exposure of the apex 40 to the beam of radiation circulating within the resonator simplifies the cooling requirements and increases the radiation handling capacity of the first cone. Also, since the apex is not an active element of the resonator, the manufacturing problems associated with the fabrication of a pointed apex are eliminated.

Resonators having coupled cavities operating in a cooperative fashion require the resonator length to be appropriately controlled. One method of controlling the length is to attach an activator such as a piezoelectric activator 45 to the back of a mirror defining one of the cavities. Although the activator may be attached to any of the optical elements defining a cavity such as the first or second mirrors, it is preferred that the actuator be attached to an element having minimum effect on the quality of the output beam such as the annular reflector 26. The activator is capable of moving the mirror in the forward or reverse direction to vary the separation between the elements defining the cavity to optimize the optical quality of the output beam. Typically, the mirrors are moved a distance less than a few wavelengths of the radiation circulating within the resonator.

Figure 3:
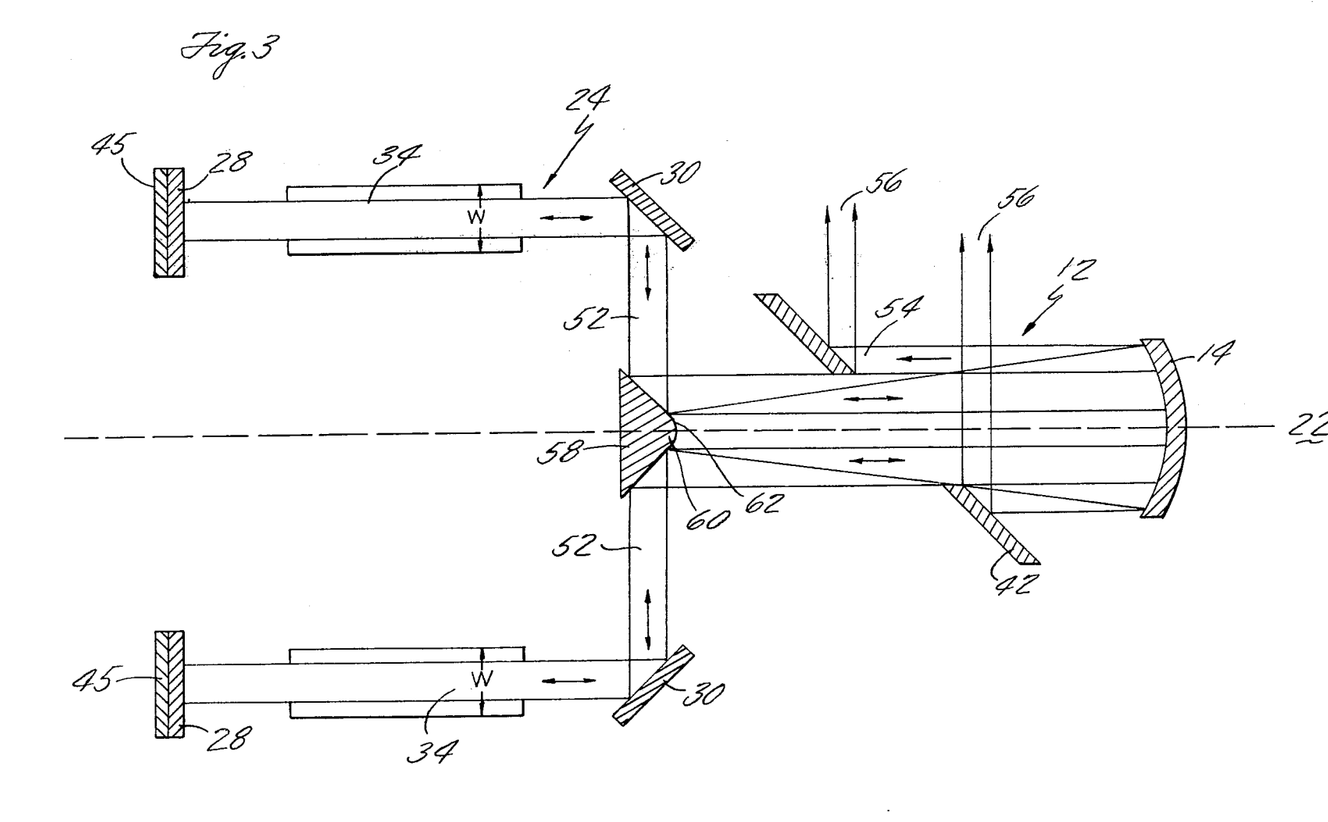
FIG. 3 is a simplified schematic of a cross-sectional view of a variation of the resonator shown in FIGS. 1 and 2.

Referring now to FIG. 3 which shows a variation of the present invention wherein the first cone 36 and the second mirror 18 as shown in FIG. 1 are replaced by a truncated cone 58 with a top 60 having a convex reflective surface 62. The convex reflective surface 62 of the top 60 defines one end of the mode control cavity 12. Combining the first cone and the second mirror into a single optical element reduces a number of optical components included in the resonator and provides a larger heat sink to remove heat from the convex surface. The larger heat sink is particularly advantageous for operation of the resonator when the beam of radiation circulating within the resonator has a high power density.

Figure 4:
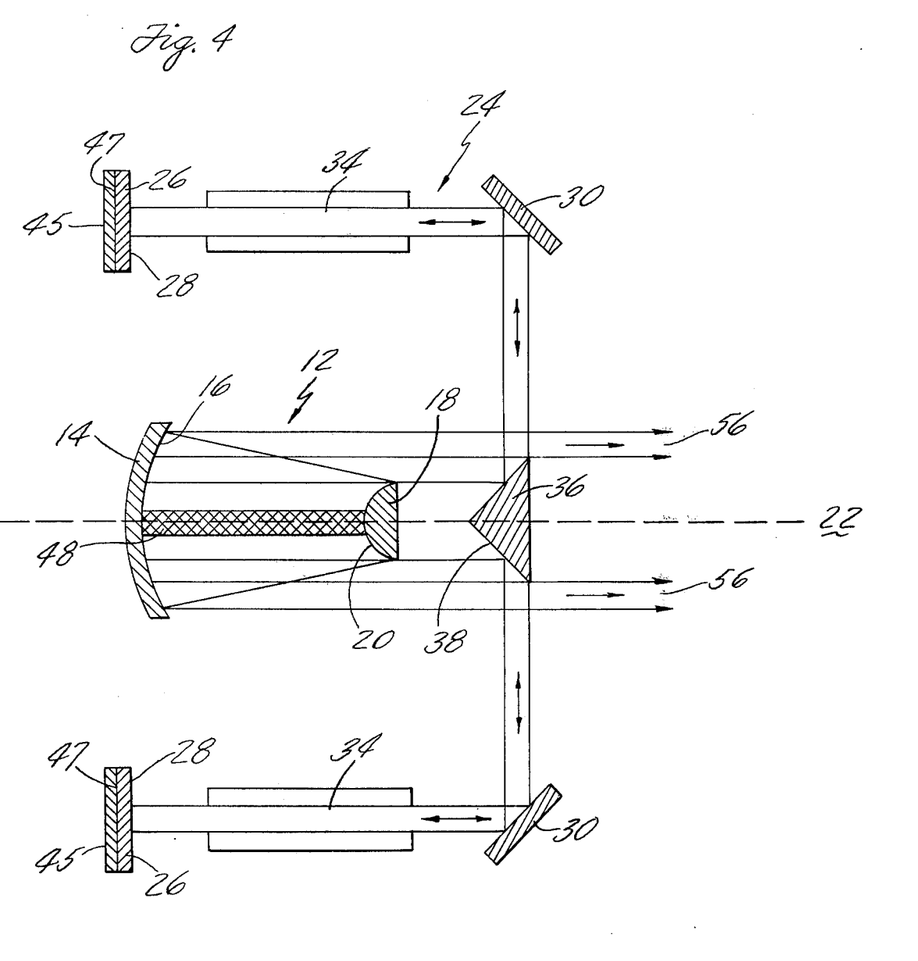
FIG. 4 is a simplified schematic of a cross-sectional view of a resonator having coupled cavities in which a first cavity is symmetrically disposed about a second cavity.

Referring now to FIG. 4, which shows a resonator configuration in which the power extraction cavity 24 is symmetrically disposed about the mode control cavity 12 and the mode control cavity is symmetrically disposed about the centerline axis 22. The operation of the resonator as shown in FIG. 4 is similar to the operation of the resonator as shown in FIGS. 1 and 2 except that the output beam 56 is coupled out of the resonator around the first cone 36 as an annular beam symmetrically disposed about the centerline axis 22. Also, the first cone 36 is rotated through an angle of one hundred eighty degrees to provide line of sight communication between the mode control cavity and the power extraction cavity. The configuration as shown in FIG. 4 provides a more compact resonator as compared to the resonator configuration as shown in FIGS. 1 and 2. It is to be recognized that the second mirror 18 and the first cone 36 may be replaced with a truncated cone 58 as shown in FIG. 3 with a top having a convex reflective surface 62.

Figure 5:
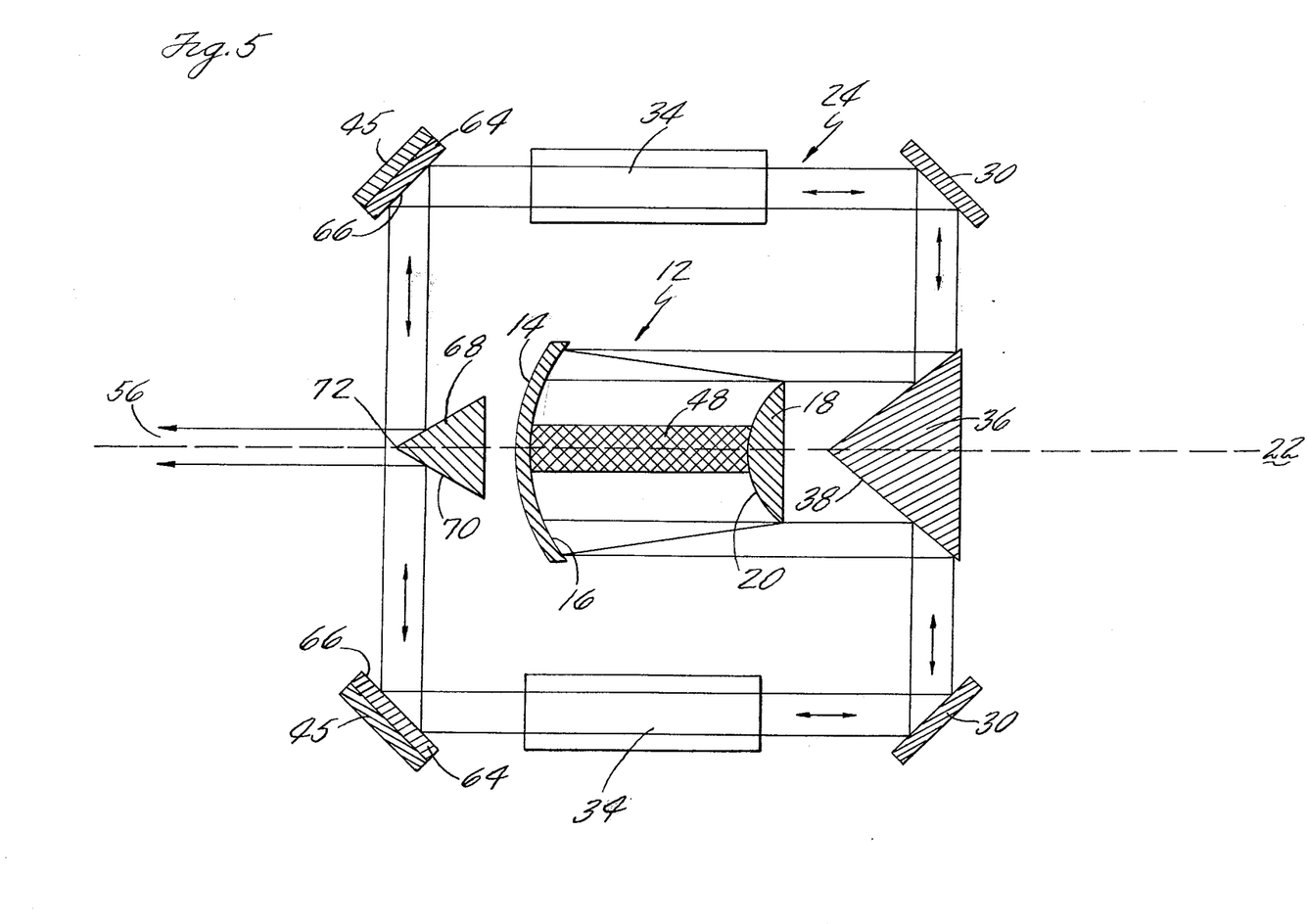
FIG. 5 is a simplified schematic of a cross-sectional view of a further variation of the resonator shown in FIG. 4.

Referring now to FIG. 5 wherein the power extraction cavity 24 is symmetrically disposed about the mode control cavity 12 and the mode control cavity is symmetrically disposed about the centerline axis 22. The power extraction cavity is defined at one end by the first conical mirror 30 and at the other end by a second conical mirror 64 having a second interior reflective surface 66. A second cone 68 having a second exterior reflective surface 70 and a second apex 72 is centrally located within the second conical mirror symmetrically about the centerline axis.

In operation, radiation passing through the gain medium 34 and incident onto the second conical mirror 64 and is reflected toward the centerline axis 22 by the interior reflective surface 66. The second exterior surface 70 of the second cone 68 intercepts a portion of the radiation to form the output beam 56. The remaining portion of the radiation passes through the centerline axis 22 and is directed into the gain medium 34 by the second interior reflective surface 66 of the second conical mirror 64. The characteristics of the mode control cavity 12 and the power extraction cavity 24 are the same as hereinbefore discussed. The exterior reflective surface of the second cone is capable of providing an output beam having a continuous cross-section. For high power operation, the tip of the apex 72 of the second cone may be rounded to eliminate being burned off by the high power of the radiation circulating from the resonator. The rounded apex will have negligible effect on the quality of the output beam in the far field.

Although this invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention that which I claim as new and desire to secure by Letters Patent of the United States is:

1. A resonator having coupled cavities comprising:
   a mode control cavity defined at one end by a first mirror and at the other end by a second mirror wherein the first and second mirrors are positioned on and symmetrically about a centerline axis;
   a power extraction cavity defined at one end by a first reflector having a flat reflective surface and at the other end by a first conical mirror having an interior reflective surface wherein the first reflector and the first conical mirror are positioned on and symmetrically about the centerline axis;
   means for optically coupling the mode control cavity and the power extraction cavity wherein said means is adapted to cooperate with the first conical mirror to vary the cross-sectional dimensions of radiation passing between the mode control cavity and the power extraction cavity; and
   means within the mode control cavity for coupling radiation from the resonator to provide an output beam wherein said means is disposed within the mode control cavity for coupling radiation passing out of the mode control cavity to provide an output beam having high optical quality.

2. The invention in accordance with claim 1 wherein the means for optically coupling the mode control cavity and the power extraction is a first cone having an apex and an exterior reflective surface positioned on and symmetrically about the centerline axis and centrally located within the first conical mirror such that the interior reflective surface of the first conical mirror is disposed symmetrically about the exterior reflective surface of the first cone wherein the reflective surface of the first cone is adapted to provide line of sight communication between the mode control cavity and the power extraction cavity.

3. The invention in accordance with claim 1 wherein the first mirror has a concave reflective surface and the second mirror has a convex reflective surface.

4. The invention in accordance with claim 3 wherein the surface of the first and second mirrors are in optical communication with one another to form a positive branch confocal unstable resonator having large geometric magnification and low Fresnel number.

5. The invention in accordance with claim 1 further including a gain medium disposed in the power extraction cavity symmetrically about the centerline axis.

6. The invention in accordance with claim 5 wherein the gain medium has an annular configuration.

7. The invention in accordance with claim 1 wherein the means for out coupling radiation from the resonator is a stripper mirror positioned on and symmetrically about the centerline axis within the mode control cavity and adapted to out couple the radiation from the resonator as an output beam having an annular cross-section.

8. The invention in accordance with claim 1 further including activator means for controlling the separation between the first reflector and the first annular mirror to optimize the quality of the output beam.

9. The invention in accordance with claim 8 wherein the activator means is a piezoelectric activator.

10. The invention in accordance with claim 1 further including activator means for controlling the separation between the mirrors defining the mode control cavity.

11. The invention in accordance with claim 1 wherein the power extraction cavity is disposed symmetrically about the mode control cavity and the radiation is diffractively out coupled from the resonator symmetrically about the means for optically connecting the mode control cavity and the power extraction cavity.

12. A resonator having coupled cavities comprising:
   a power extraction cavity defined at one end by a first reflector having a flat reflective surface and at the other end by a first conical mirror having an interior reflective surface wherein the first reflector and the first conical mirror are positioned on and symmetrically about a centerline axis;
   a mode control cavity defined at one end by a first mirror having a concave reflective surface and at the other end by a truncated cone having a top with a convex reflective surface wherein the first mirror and the truncated cone are positioned on and symmetrically about the centerline axis and the concave reflective surface of the first mirror is in optical communication with the convex reflective surface of the top of the truncated cone to form a positive branch confocal unstable resonator having large geometric magnification and low Fresnel number;
   means for optically connecting the mode control cavity and the power extraction cavity wherein said means is adapted to cooperate with the first conical mirror to vary the cross-sectional dimensions of radiation passing between the mode control cavity and the power extraction cavity; and means within the mode control cavity for out coupling radiation from the resonator to provide an output beam wherein said means is disposed within the mode control cavity for coupling radiation passing out of the mode control cavity to provide an output beam having high optical quality.

13. The invention in accordance with claim 12 wherein the means for optically connecting the mode control cavity and the power extraction cavity is an exterior reflective surface on the truncated cone positioned on and symmetrically about the centerline axis and centrally located within the first conical mirror such that the interior reflective surface of the first conical mirror is disposed symmetrically about the exterior reflective surface of the truncated cone wherein the exterior reflective surface of the truncated cone is adapted to provide line of sight communication between the mode control cavity and the power extraction cavity.

14. A resonator having coupled cavities comprising:
   a mode control cavity defined at one end by a first mirror having a concave reflective surface and at the other end by a second mirror having a convex reflective surface wherein the first mirror and the second mirror are positioned on and symmetrically about a centerline axis;
   a power extraction cavity defined at one end by a first conical mirror having an interior reflective surface and at the other end by a second conical mirror having a second interior reflective surface wherein the first conical mirror and the second conical mirror are positioned on and symmetrically about the centerline axis;
   a first cone having an apex and an exterior reflective surface positioned on and symmetrically about the centerline axis and centrally located within the first conical mirror such that the interior reflective surface of the first conical mirror is disposed symmetrically about the exterior reflective surface of the first cone wherein the exterior reflective surface of the first cone is adapted to provide line of sight communication between the mode control cavity and the power extraction cavity and to vary the cross-sectional dimensions of radiation passing between the mode control cavity and the power extraction cavity; and
   a second cone having an apex and a second exterior reflective surface positioned on and symmetrically about the centerline axis and centrally located within the second conical mirror such that the second interior reflective surface of the second conical mirror is disposed symmetrically about the second exterior reflective surface of the second cone wherein the second reflective surface of the second cone is adapted to out couple radiation from the resonator to provide a laser beam.

15. The invention in accordance with claim 14 wherein the power extraction cavity is symmetrically disposed about the mode control cavity.

* * * * *